United States Patent [19]

Crook

[11] 4,215,463
[45] Aug. 5, 1980

[54] METHOD OF FIELD FORMING A LOOP SPLICE FOR WIRE ROPE

[75] Inventor: Edward J. Crook, Tulsa, Okla.

[73] Assignee: American Hoist & Derrick Company, Tulsa, Okla.

[21] Appl. No.: 915,929

[22] Filed: Jun. 15, 1978

Related U.S. Application Data

[63] Continuation of Ser. No. 684,562, May 10, 1976, abandoned.

[51] Int. Cl.² ............................................. B23P 25/00
[52] U.S. Cl. .................................... 29/461; 29/526 R; 24/122.6; 24/135 K; 403/209
[58] Field of Search ........................ 29/461, 526 R; 24/135 K, 122.6, 135 R; 403/209, 213

[56] References Cited

U.S. PATENT DOCUMENTS

| 479,777 | 8/1892 | Ashworth | 403/209 |
| 849,100 | 4/1907 | Bearse | 403/209 |
| 1,298,052 | 3/1919 | Kelley | 403/209 X |
| 1,338,062 | 4/1920 | Wolfe | 403/209 |
| 1,667,345 | 4/1928 | Cummins | 403/209 X |
| 2,412,941 | 12/1946 | Bannerman et al. | 29/461 X |
| 3,007,243 | 11/1961 | Peterson | 29/461 X |
| 3,087,216 | 4/1963 | Tedesco | 403/209 |
| 3,932,697 | 1/1976 | Hood | 29/461 |

FOREIGN PATENT DOCUMENTS

| 112968 | 5/1941 | Australia | 403/209 |
| 1029066 | 4/1958 | Fed. Rep. of Germany | 403/209 |

Primary Examiner—Charlie T. Moon
Attorney, Agent, or Firm—Head & Johnson

[57] ABSTRACT

A method of providing a strong field splice for a wire rope sling, and the like, involving the steps of taking the preformed wire rope and unravelling a selected length of the end of the rope, forming two groups of strands, and reweaving them together in the form of the loop; and when the reweaving is completed, the two remaining ends are woven together to again form the original wire rope. This dead end is clamped to the live portion of the wire rope by means of a streamlined clamp.

1 Claim, 8 Drawing Figures

METHOD OF FIELD FORMING A LOOP SPLICE FOR WIRE ROPE

This is a continuation of application Ser. No. 684,562, filed May 10, 1976, now abondoned.

BACKGROUND OF THE INVENTION

This invention lies in the field of wire rope apparatus. More particularly, it concerns a method of forming a strong loop in the end of a wire rope sling in a way that is not totally dependent upon the clamping device to develop the strength of the loop and can be done in the field with use of common tools.

In the prior art, it has been customary to make a loop such, for example, as one to hold a thimble, by wrapping the wire rope around the thimble and clamping the dead end to the live end by means of one or a plurality of U-bolt type clamps or saddle clamps. It is common knowledge that the ability of the loop to develop great strength is dependent on the clamping force developed by the U-bolt clamp or saddle clamp. This clamping force is directly related to the tightening of the bolts to prescribed limits which requires torque measuring devices, or the like. It is also common knowledge that when the clamping devices are tightened sufficiently they tend to crush the wire rope and cause such stress raising conditions to reduce the ultimate strength of the wire rope by approximately 20%.

In the prior art it has also been customary to make a loop such, for example, as one to hold a thimble, by wrapping the wire rope around the thimble and separating the strands of the dead end and then selectively reweaving the strands into the forceably separated strands of the live end. However, this is a very difficult and time-consuming operation and is not easily accomplished in the field.

It has also been shown in the prior art that by unwrapping the separate strands of the rope and forming two groups or bundles or strands, one group can form a loop in a first-handed way and the other group can form a loop in the second-handed way, and the two groups can be rewoven together in the loop so that the complete loop itself is a full rope, for example. The problem of what to do with remaining dead end bundles is a serious one. These have generally been collected in a random manner and inserted into a tubular sleeve. The sleeve is then compressed or swaged to a smaller diameter encapsulating the dead end bundles. It requires a press of great capacity to sufficiently compress the tubular sleeve and this is not easily accomplished in the field. The force required for ⅜" rope is of the order of 200 tons, while for 4" rope the force may be of the order of 3,000 tons.

It is, therefore, a first object of this invention to provide a field method of forming a strong loop in a wire rope sling by dividing the strands into two bundles, forming a right-handed and a left-handed loop of each, and weaving the two bundles together in a loop. After the loop is completed, weaving the two ends of the two bundles together to again form a complete wire rope. This reformed dead end is now of a uniform and predictable diameter and shape making it convenient to clamp it to the live end by means of a streamline structure that is not likely to tangle and catch on obstructions.

It is still a further object of this invention to provide a field method of forming a strong loop in a wire rope sling by dividing the strands into two bundles, forming a right-handed and a left-handed loop of each, and weaving the two bundles together in a loop. After the loop is completed, weaving the two ends to again form a complete wire rope, and clamping the reformed dead end of the wire rope to the live end by means of a streamline structure the construction of this loop is such as to provide strength that is equal to or greater than 95% of the catalog strength of the wire rope.

SUMMARY OF THE INVENTIONS

These and other objects are realized, and the limitations of the prior art are overcome in this invention by forming two bundles of wire strands by unravelling the wires of the wire rope, forming a right-hand loop and a left-hand loop, respectively, with the two bundles of wires, and reweaving the two bundles together in the loop to form a full wire rope loop, but still with two ends of the two bundles of wires. The two bundles of wire ends are then rewoven together to form a wire rope dead end, and the dead end is clamped to the live rope with Crosby type clamps, or preferably with a streamlined clamp, which is part of this invention.

BRIEF DESCRIPTION OF THE DRAWINGS

These and other objects and advantages of this invention and a better understanding of the principles and details of the invention will be evident from the following description taken in conjunction with the appended drawings in which.

DESCRIPTION OF THE PREFERRED EMBODIMENT

Figure 1:
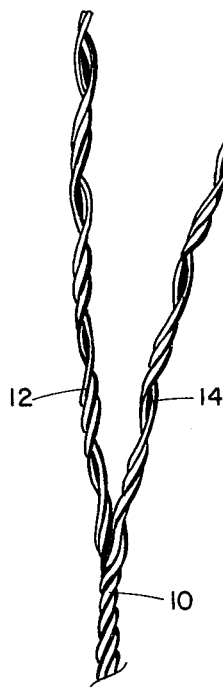
FIG. 1 represents the end of the wire rope with two bundles of strands.
Figure 2:
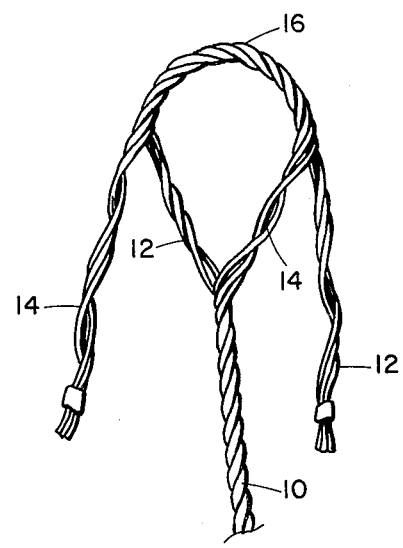
FIG. 2 shows a partially rewoven loop of the two bundles of strands.

Referring now to the drawings, FIG. 1 shows an end of the wire rope 10 with the wires separated into two groups or bundles, 12 and 14, half of the total in each of the two bundles. The length of the unwound bundles is sufficient to form the loop of FIG. 2 with a selected additional length. One bundle of wires 12 forms a right-hand loop about the end of the live portion 10, and the other bundle 14 forms a left-hand loop about the live portion 10, and these two bundles of wire are rewoven together 16 to form a complete wire rope.

Figure 3:
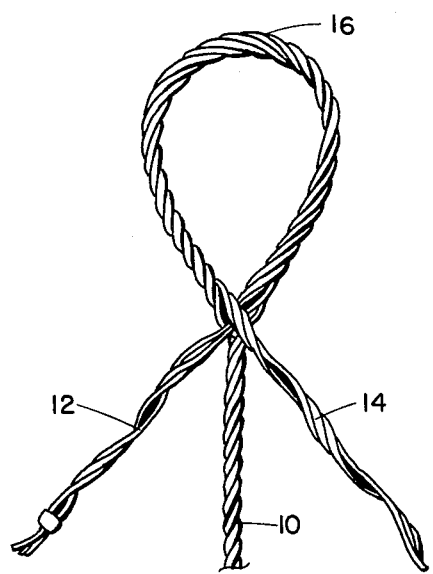
FIG. 3 shows a completely rewoven loop and the two bundles of strands at the point of connection of the live rope.

FIG. 3 shows the bundles completely rewoven throughout the wire loop 16 with additional ends 12 and 14 extending beyond the end of the loop.

Figure 4:
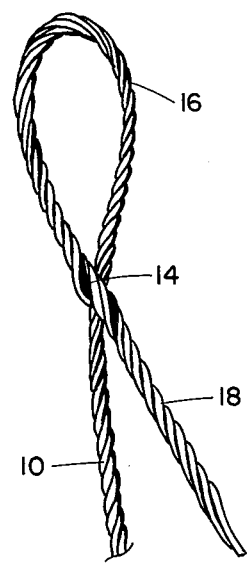
FIG. 4 shows the two bundles of strands rewoven into a dead end rope.

FIG. 4 shows the assembly of FIG. 3 with the two ends 12 and 14 further rewoven to form a complete wire rope 18 which is cut to the desired length.

Figure 5:
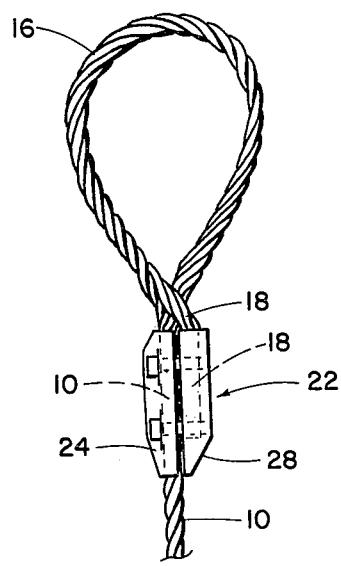
FIG. 5 shows the dead end clamped to the live end by the clamp illustrated in FIGS. 6, 7 and 8.

FIG. 5 shows the assembly of FIG. 4 with the end 18 cut to the desired length and clamped to the live portion 10 by means of a streamlined clamp which will be described further in connection with FIGS. 6, 7, and 8.

Figure 6:
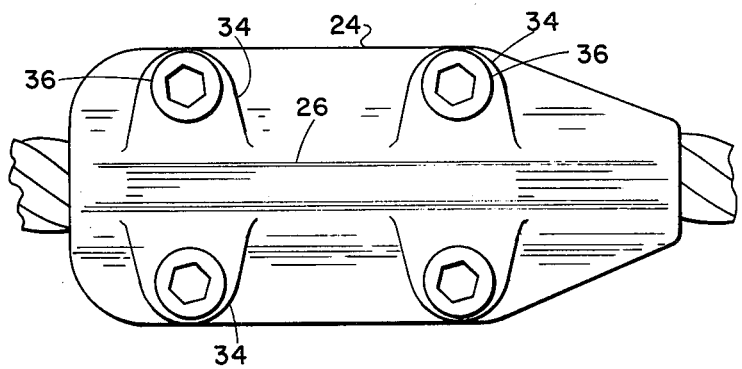
FIGS. 6, 7, and 8 shows three views of an improved type of clamp for clamping a dead end to a live end.
Figure 8:
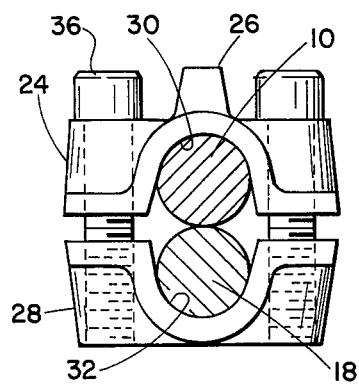
Figure 7:
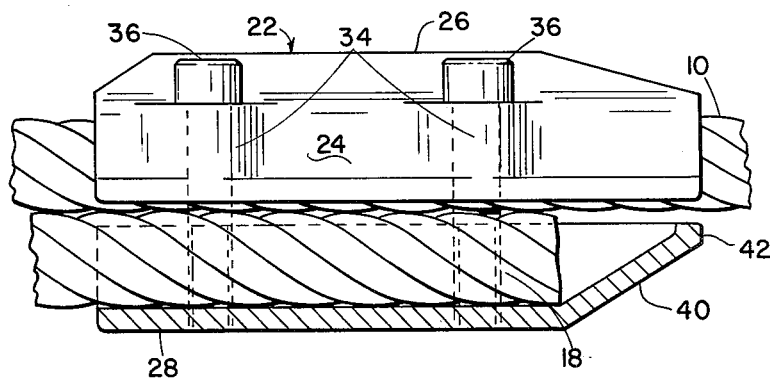

FIGS. 6, 7 and 8 illustrate and improved type of wire clamp which comprises two principal portions. These are semi-cylinders, which are adapted to fit around a pair of wire ropes. Four or more bosses are drilled and tapped so that the two halves of the clamp can be clamped together by bolts.

FIG. 6 is a top view of the clamp. The top half 24 comprises a cylindrical portion 30 having an internal bore of diameter such that it will snugly fit the line rope 10. There are shown four cylindrical bosses 34, two on each side, with threaded holes in the lower half 28. Bolts 36 are inserted through the upper half 24; and by tightening the bolts 36, the two halves 24 and 28 of the clamp can be pulled together to clamp the wire ropes 10 and 18 as strongly as desired.

FIG. 7 shows that the dead end is hidden inside of the bottom half which at 40 is carried up on a sloping angle so as to shield the dead end 18 from being bumped or caught on obstructions and unravelled, etc. The two ropes are completely supported over a substantial length between the bolts, with the clamp circumferentially surrounding the ropes. Consequently, there is much greater friction to possible slippage of one rope with respect to the other. Therefore, the strength of the clamp 22 is much greater than that of the conventional two or three saddle type clamps.

On the top half where the heads of the bolts 36 extend up above the top of the bosses 34, a longitudinal ridge is provided over the center line of the clamp. The height of the ridge 26 is slightly higher than the tops of the bolts, so that as the cable and clamps slide over an object, there will be no obstructions larger than substantially the small projection 42 at the end of the clamp. Thus, the clamp will slide easily over objects and projections in the use of the wire rope or sling.

What has been described is an improved model of a wire rope clamp comprising two halves which have a semi-cylindrical longitudinal cavity such that when the two halves are placed together, two wire ropes can be held tightly in contact by means of four or more bolts which clamp the two halves of the clamp together. The portions of the clamp are tapered in their end construction, and a protective ridge is provided over one portion to protect the heads of the bolts from catching on obstructions, etc.

Also described is a method of separating two groups of wires in a wire rope, forming a loop, reweaving the groups of wires in the loop to form a complete rope; and after the loop is completed, reweaving the two ends together to form a dead end rope, and clamping the dead end rope into the clamp described above.

While the clamp shown in FIGS. 6, 7, and 8 is shown with four bolts, it will be clear that fewer than four bolts or six or more bolts could be used.

Also, a variation of the clamp shown in FIG. 7 could be provided in which the dead end 18 extends out both ends of the clamp, and the sloping end 40 of the lower half 28 is absent, and both ends of the lower half are similar. Thus, with a long dead end 18, one clamp like FIG. 8 can be clamped at the end of the dead end, and a second clamp, with 28 configured as above, can be placed adjacent the loop.

The splice shown in FIG. 4 with the two ends completely rewoven can develop about 55% of the catalog strength of the wire rope before it will begin to unlay. The addition of the clamp 22 as in FIG. 5 will increase the strength of the loop to a breaking strength of at least 95% of catalog strength of the original wire rope. This is accomplished with a minimum emphasis on clamping power required. This clamp can easily be applied in the field with nothing more than an Allen-head wrench, and does not require a torque wrench.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

I claim:

1. The method of field forming a loop splice at the live end of wire rope comprising the step of:
   (a) unravelling a selected length of said live end of wire rope to form two bundles of wires, with substantially the same number of wires in each bundle;
   (b) forming a left-hand loop about the live end with one bundle and a right-hand loop with the other bundle;
   (c) reweaving the two bundles in the loop to form a complete rope, until the loop is complete, and two bundle ends extend on opposite sides of said live end;
   (d) reweaving the two bundles to form a dead end rope;
   (e) positioning a top half of a clamp on said live-end;
   (f) positioning a bottom half of said clamp opposite said top half, the bottom half having a portion that slopes upwardly and so positioned that the sloping portion shields the terminus of the dead end; and
   (g) drawing and retaining said top and bottom halves together at two longitudinally spaced points on each side of said dead and live ends.

* * * * *

UNITED STATES PATENT AND TRADEMARK OFFICE
CERTIFICATE OF CORRECTION

PATENT NO. : 4,215,463
DATED : August 5, 1980
INVENTOR(S) : Edward J. Crook, Jr.

It is certified that error appears in the above-identified patent and that said Letters Patent are hereby corrected as shown below:

The name of the inventor is shown as "EDWARD J. CROOK".

The name of the inventor is --EDWARD J. CROOK, JR.--.

Signed and Sealed this

Twenty-fifth Day of November 1980

[SEAL]

Attest:

SIDNEY A. DIAMOND

*Attesting Officer*     *Commissioner of Patents and Trademarks*